United States Patent
Murphy et al.

(10) Patent No.: US 12,259,182 B2
(45) Date of Patent: Mar. 25, 2025

(54) PRODUCE RIPENING DETECTION IN A REFRIGERATOR APPLIANCE

(71) Applicant: Haier US Appliance Solutions, Inc., Wilmington, DE (US)

(72) Inventors: Reagan Murphy, Louisville, KY (US); Michael Goodman Schroeder, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 156 days.

(21) Appl. No.: 18/094,146

(22) Filed: Jan. 6, 2023

(65) Prior Publication Data

US 2024/0230216 A1    Jul. 11, 2024

(51) Int. Cl.
| | |
|---|---|
| *F25D 29/00* | (2006.01) |
| *F25D 25/02* | (2006.01) |
| *G06T 7/90* | (2017.01) |
| *G06V 20/68* | (2022.01) |

(52) U.S. Cl.
CPC ......... *F25D 29/008* (2013.01); *F25D 25/025* (2013.01); *G06T 7/90* (2017.01); *G06V 20/68* (2022.01); *F25D 2700/00* (2013.01)

(58) Field of Classification Search
CPC .... F25D 29/00; F25D 29/008; F25D 2500/06; F25D 2700/00; G06T 7/90; G06V 20/68
See application file for complete search history.

(56) References Cited

U.S. PATENT DOCUMENTS

| | | | |
|---|---|---|---|
| 2016/0203591 A1* | 7/2016 | Justaniah | F25D 29/00 348/89 |
| 2018/0053140 A1* | 2/2018 | Baca | G01N 33/02 |
| 2020/0097776 A1* | 3/2020 | Kim | G06T 7/70 |
| 2022/0262143 A1* | 8/2022 | Liu | G06V 10/82 |

FOREIGN PATENT DOCUMENTS

| | | |
|---|---|---|
| JP | 2021165604 A | 10/2021 |
| KR | 20210074812 A | 6/2021 |
| WO | WO2017154155 A1 | 9/2017 |

OTHER PUBLICATIONS

CN 115540444 (English Translation) (Year: 2022).*

* cited by examiner

*Primary Examiner* — Jonathan Bradford
(74) *Attorney, Agent, or Firm* — Dority & Manning, P.A.

(57) ABSTRACT

A refrigerator appliance and a method of operating a refrigerator appliance to detect produce ripening. The refrigerator includes a camera assembly in a chilled chamber to obtain an image of a produce item and analyze the image for a ripeness value. Comparing the ripeness value of produce item to a predetermined value may be used to determine if the produce item has reached an optimal ripeness condition.

20 Claims, 7 Drawing Sheets

PRODUCE RIPENING DETECTION IN A REFRIGERATOR APPLIANCE

FIELD OF THE INVENTION

The present subject matter relates generally to refrigerator appliances, and more particularly to systems and methods for managing the status of produce items stored in such refrigerator appliances.

BACKGROUND OF THE INVENTION

Refrigerator appliances generally include a cabinet that defines a chilled chamber for receipt of food articles for storage. In addition, refrigerator appliances include one or more doors rotatably hinged to the cabinet to permit selective access to food items stored in chilled chamber(s). The refrigerator appliances can also include various storage components mounted within the chilled chamber and designed to facilitate storage of food items therein. Such storage components can include racks, bins, shelves, or drawers that receive food items and assist with organizing and arranging of such food items within the chilled chamber.

Produce, generally fresh fruits and vegetables, are often stored in bins or drawers in the chilled chamber. Typically, produce is refrigerated to slow the ripening process sufficiently to allow consumption at an optimal ripeness, among other reasons. Throughout the ageing or ripening process, most produce items lose chlorophyll, which can be correlated to the loss of green color. Ripening to an optimal degree can typically be visually determined. Without frequent attention, however, an optimal degree of ripeness can be missed. Fruits and vegetables may remain in the chilled chamber beyond an optimal ripeness, leading to less than desirable produce usage.

Accordingly, a refrigerator appliance with systems for improved inventory management would be useful. More particularly, a refrigerator appliance with a method of operation that includes a produce inventory management system for monitoring the ripeness of individual produce items during refrigerated storage and alerting a user when an optimal ripeness of such items has been reached would be useful.

BRIEF DESCRIPTION OF THE INVENTION

Aspects and advantages of the invention will be set forth in part in the following description, may be apparent from the description, or may be learned through practice of the invention.

In one exemplary aspect, a method of operating a refrigerator appliance is disclosed. The refrigerator appliance comprises a cabinet defining a chilled chamber for receiving a produce item and a camera assembly positioned with a field of view including the produce item. The method comprises obtaining an initial image of the produce item using the camera assembly and analyzing the initial image using an image recognition process to identify an initial ripeness value of the produce item. A subsequent image of the produce item is obtained using the camera assembly and the subsequent image is analyzed using the image recognition process to identify a subsequent ripeness value of the produce item. The method further comprises comparing the subsequent ripeness value to the initial ripeness value to determine if a difference has reached a predetermined value and signaling that an optimal ripeness condition has been reached if the predetermined value has been reached.

In another example aspect, a refrigerator appliance is disclosed, the refrigerator appliance comprising a cabinet defining a chilled chamber for receiving a produce item, a camera assembly positioned with a field of view including the produce item, and a controller in operable communication with the camera assembly, the controller operable to perform a method of operating the refrigerator appliance. The method of operating the refrigerator appliance comprises obtaining an initial image of the produce item using the camera assembly and analyzing the initial image using an image recognition process to identify an initial ripeness value of the produce item. A subsequent image of the produce item is obtained using the camera assembly and the subsequent image is analyzed using the image recognition process to identify a subsequent ripeness value of the produce item. The method further comprises comparing the subsequent ripeness value to the initial ripeness value to determine if a difference has reached a predetermined value and signaling that an optimal ripeness condition has been reached if the predetermined value has been reached.

In another exemplary aspect a method of operating a refrigerator appliance is disclosed. The refrigerator appliance comprises a cabinet defining a chilled chamber for receiving a produce item and a camera assembly positioned with a field of view including the produce item. The method of operating the refrigerator appliance comprises obtaining an image of the produce item using the camera assembly, analyzing the image using an image recognition process to identify a green channel value of the produce item and comparing the green channel value to a predetermined value. The method further comprises signaling that an optimal ripeness condition has been reached if the green channel value corresponds with the predetermined value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
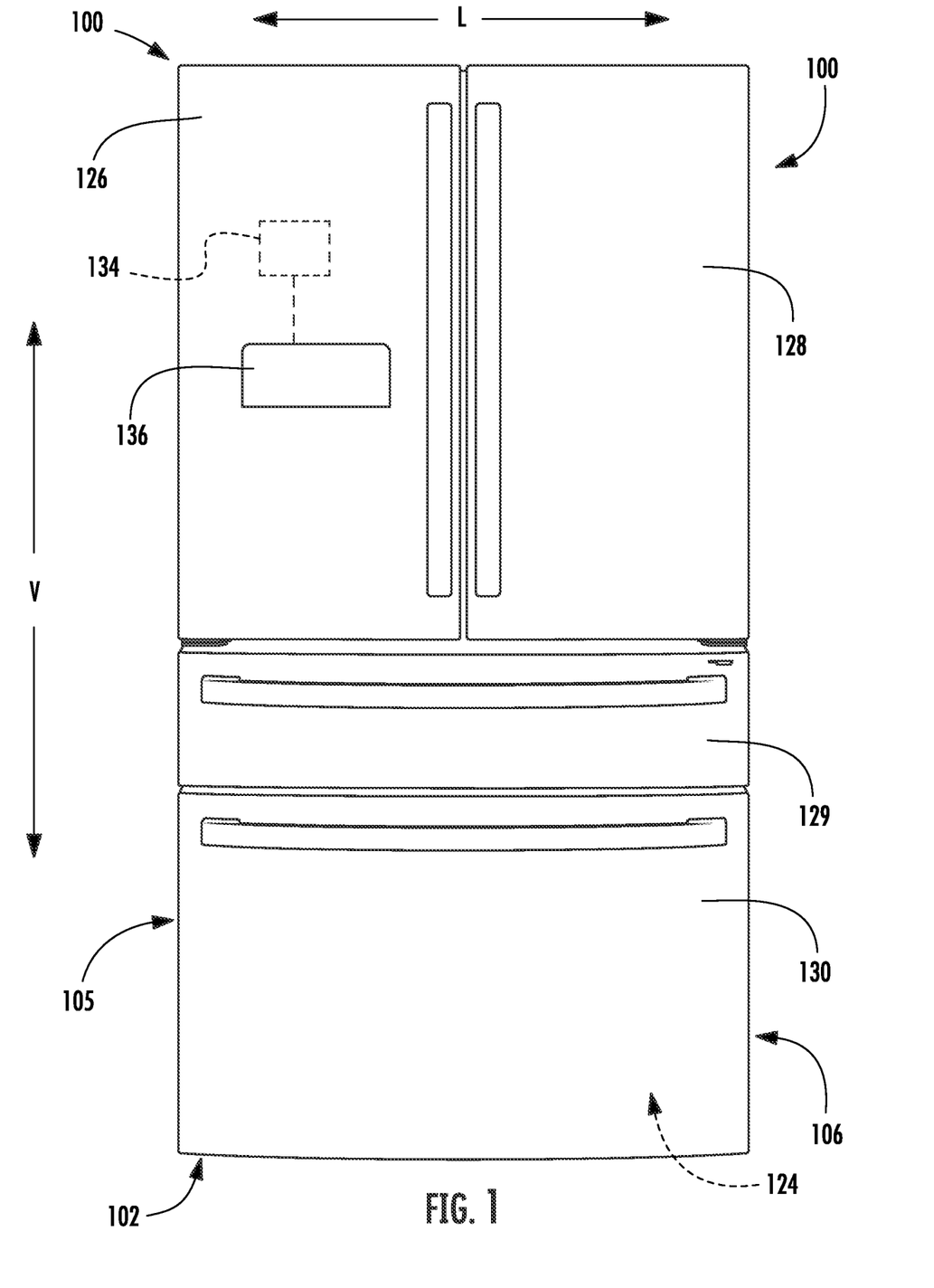
FIG. 1 provides a front view of a refrigerator appliance according to an exemplary embodiment of the present subject matter.
Figure 2:
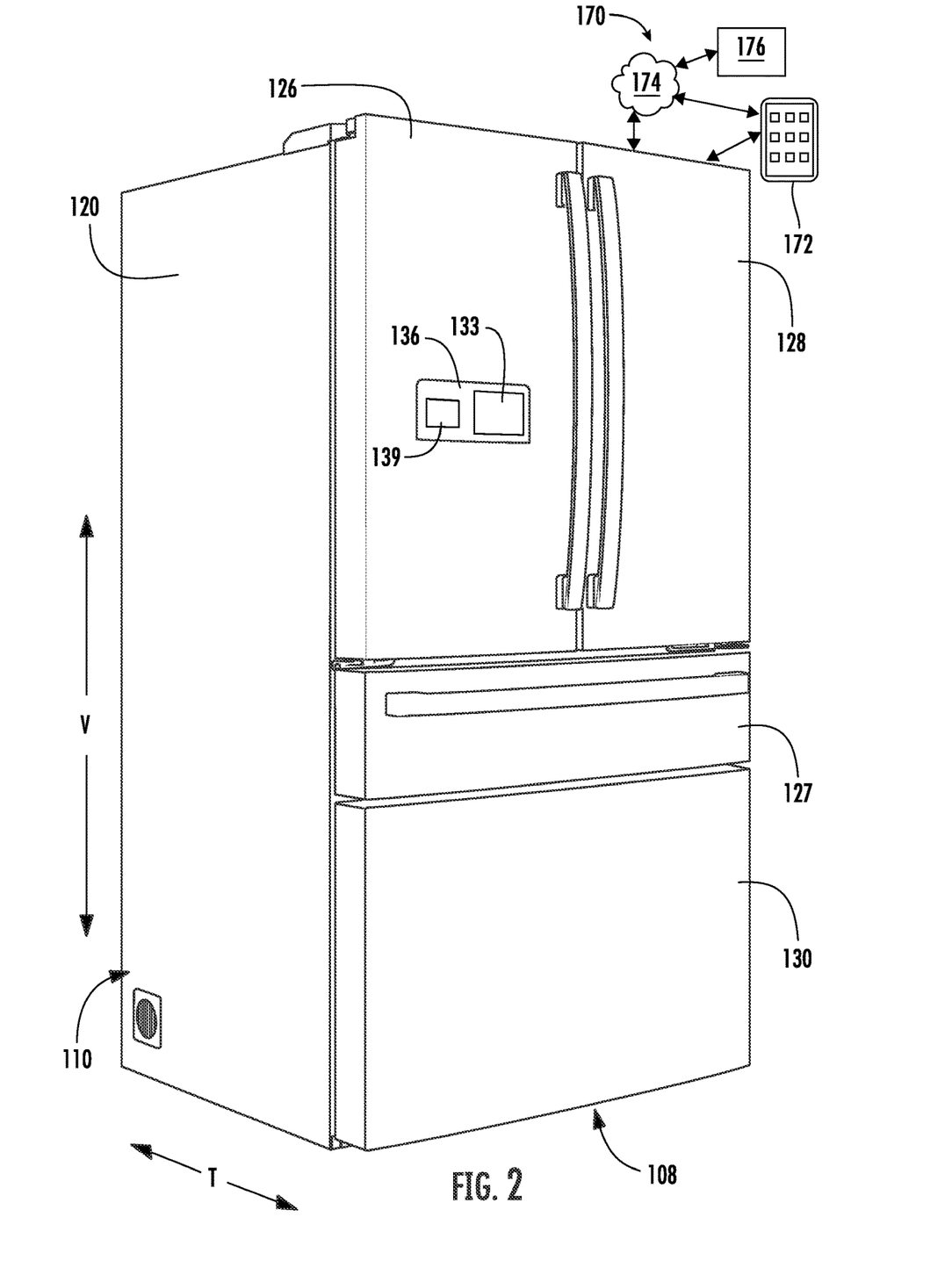
FIG. 2 provides a perspective view of the refrigerator appliance of FIG. 1.
Figure 3:
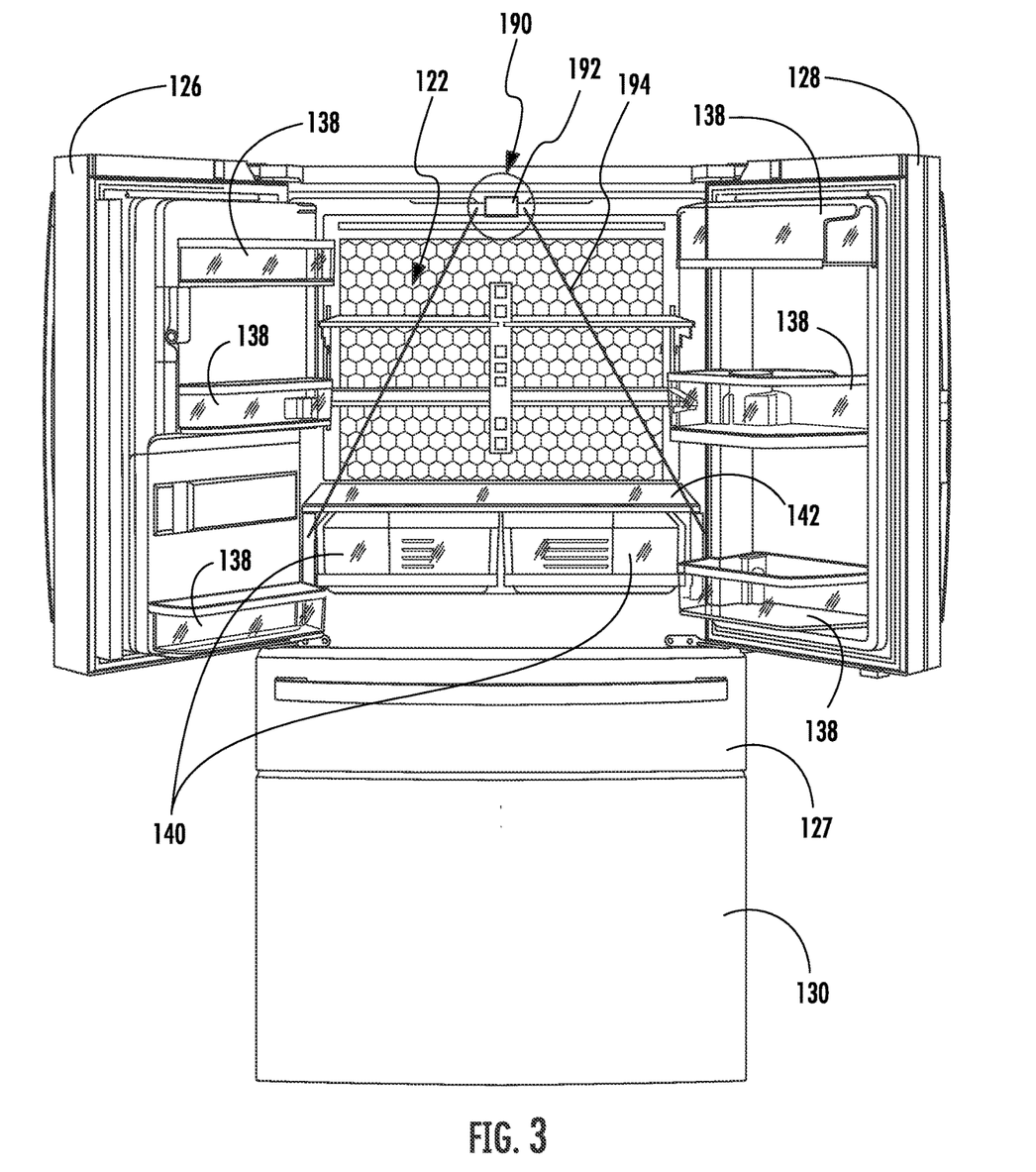
FIG. 3 provides a front view of the refrigerator appliance of FIG. 1 with doors thereof in an open position.
Figure 4:
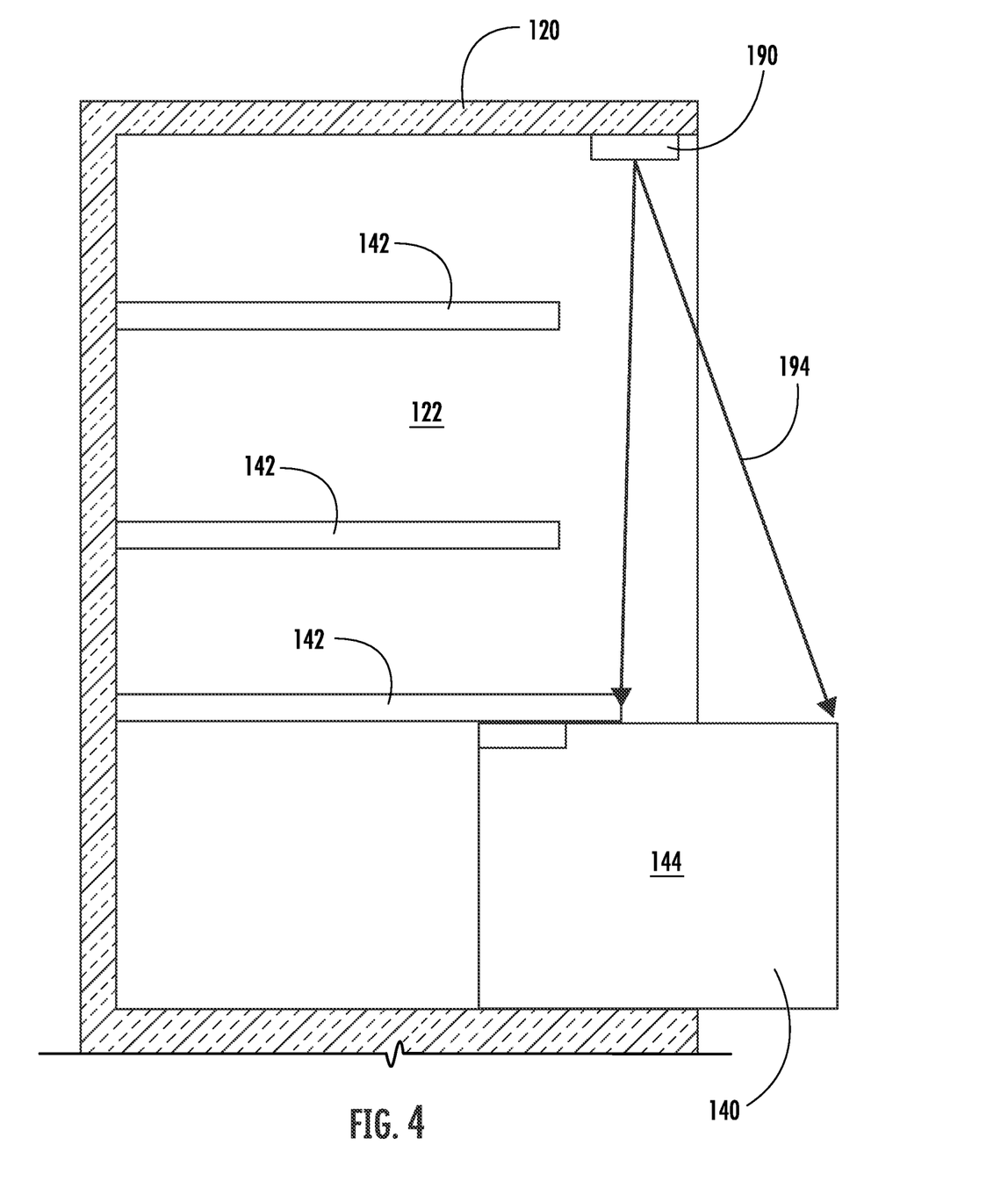
FIG. 4 provides a section view of a portion of the chilled chamber of the refrigerator appliance according to the present disclosure.

FIG. 1 is a front view of an exemplary embodiment of a refrigerator appliance 100. FIG. 2 is a perspective view of the refrigerator appliance 100. FIG. 3 is a front view of the refrigerator appliance 100 with doors, left door 126 and right door 128, thereof in an open position. Refrigerator appliance 100 extends between a top 101 and a bottom 102 along a vertical direction V. Refrigerator appliance 100 also extends between a first side 105 and a second side 106 along a lateral direction L. As shown in FIG. 2, a transverse direction T may additionally be defined perpendicular to the vertical and lateral directions V and L. Refrigerator appliance 100 extends along the transverse direction T between a front portion 108 and a back portion 110.

Refrigerator appliance 100 includes a cabinet or housing 120 defining an upper fresh food chamber, chilled chamber 122 (FIG. 3) and a lower freezer chamber or frozen food storage chamber 124 arranged below the chilled chamber 122 along the vertical direction V. In some embodiments, an auxiliary food storage chamber (not shown) may be positioned between the chilled chamber 122 and the frozen food storage chamber 124, e.g., along the vertical direction V. Because the frozen food storage chamber 124 is positioned below the chilled chamber 122, refrigerator appliance 100 is generally referred to as a bottom mount refrigerator. In the exemplary embodiment, housing 120 also defines a mechanical compartment (not shown) for receipt of a sealed cooling system (not shown). Using the teachings disclosed herein, one of skill in the art will understand that the present invention can be used with other types of refrigerators (e.g., side-by-sides) as well. Consequently, the description set forth herein is for illustrative purposes only and is not intended to limit the invention in any aspect.

Refrigerator doors 126, 128 are each rotatably hinged to an edge of housing 120 for accessing chilled chamber 122. It should be noted that while two doors 128 in a "French door" configuration are illustrated, any suitable arrangement of doors utilizing one, two or more doors is within the scope and spirit of the present disclosure. A freezer door 130 is arranged below refrigerator doors 126, 128 for accessing frozen food chamber 124. In the exemplary embodiment, freezer door 130 is coupled to a freezer drawer (not shown) slidably mounted within frozen food chamber 124. An auxiliary door 129 may be coupled to an auxiliary drawer (not shown) which is slidably mounted within the auxiliary chamber (not shown).

Operation of the refrigerator appliance 100 can be regulated by a controller 134 that is operatively coupled to at least a user interface panel 136 and camera assembly 190 including camera 192. User interface panel 136 provides selections for user manipulation of the operation of refrigerator appliance 100 to modify environmental conditions therein, such as temperature selections, etc. Panel 136 provides selections for user manipulation of the operation of refrigerator appliance 100 such as, e.g., temperature selections, selection of automatic or manual override humidity control (as described in more detail below), etc. In response to user manipulation of the user interface panel 136, the controller 134 operates various components of the refrigerator appliance 100. Operation of the refrigerator appliance 100 can be regulated by the controller 134, e.g., controller 134 may regulate operation of various components of the refrigerator appliance 100 in response to programming and/or user manipulation of the user interface panel 136.

The controller 134 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. It should be noted that controllers 134 as disclosed herein are capable of and may be operable to perform any methods of operating the refrigerator appliance 100 and associated method steps as disclosed herein. As such, controller 134 may be in operable communication with all systems of refrigerator appliance 100, at least user interface panel 136, display 133, camera assembly 190, and control and operating systems (not shown) for the chilled chamber 122.

The controller 134 may be positioned in a variety of locations throughout refrigerator appliance 100. In the illustrated embodiment, the controller 134 may be located within the door 128. In such an embodiment, input/output ("I/O") signals may be routed between the controller and various operational components of refrigerator appliance 100. In one embodiment, the user interface panel 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display 133 component, such as a digital or analog display device designed to provide operational feedback to a user by displaying graphic images or textural messages. For example, the user interface 136 may include a touchscreen providing both input and display functionality. The user interface 136 may be in communication with the controller via one or more signal lines or shared communication busses.

User interface panel 136 may also include an auditory signaling device, such as a speaker 139. Speaker 139, when activated, may emit an alarm or other audible signal to a user to signal a certain condition has been reached within the refrigerator appliance 100.

Referring to FIG. 2, a schematic diagram of an external communication system 170 will be described according to an exemplary embodiment of the present subject matter. In general, external communication system 170 is configured for permitting interaction, data transfer, and other communications between refrigerator appliance 100 and one or more external devices. For example, this communication may be used to provide and receive operating parameters, user instructions or notifications, performance characteristics, user preferences, or any other suitable information for improved performance of refrigerator appliance 100. In addition, it should be appreciated that external communication system 170 may be used to transfer data or other information to improve performance of one or more external devices or appliances and/or improve user interaction with such devices.

For example, external communication system 170 permits controller 134 of refrigerator appliance 100 to communicate with a separate device external to appliance 100, referred to generally herein as an external device 172. As described in more detail below, these communications may be facilitated using a wired or wireless connection, such as via a network 174. In general, external device 172 may be any suitable device separate from appliance 100 that is configured to provide and/or receive communications, information, data, or commands from a user. In this regard, external device 172 may be, for example, a personal phone, a smartphone, a tablet, a laptop or personal computer, a wearable device, a smart home system, or another mobile or remote device.

In addition, a remote server 176 may be in communication with appliance 100 and/or external device 172 through network 174. In this regard, for example, remote server 176 may be a cloud-based server 176, and is thus located at a distant location, such as in a separate state, country, etc. According to an exemplary embodiment, external device 172 may communicate with a remote server 176 over network 174, such as the Internet, to transmit/receive data or information, provide user inputs, receive user notifications or instructions, interact with or control refrigerator appliance 100, etc. In addition, external device 172 and remote server 176 may communicate with refrigerator appliance 100 to communicate similar information. According to example embodiments, remote server 176 may be in operable communication with camera(s) 192 and configured to receive and analyze images obtained by camera(s) 192 of refrigerator appliance 100, e.g., to facilitate produce ripening detection (to be discussed in greater detail below).

In general, communication between refrigerator appliance 100, external device 172, remote server 176, and/or other user devices or appliances may be carried using any type of wired or wireless connection and using any suitable type of communication network, non-limiting examples of which are provided below. For example, external device 172 may be in direct or indirect communication with appliance 100 through any suitable wired or wireless communication connections or interfaces, such as network 174. For example, network 174 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 170 is described herein according to an exemplary embodiment of the present subject matter. However, it should be appreciated that the exemplary functions and configurations of external communication system 170 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

As may be seen in FIG. 3, a plurality of food storage elements, such as bins 138, shelves 142, and drawers 140 are disposed within the chilled chamber 122. As will be described in more detail below, the drawers 140 may be configured for storing produce, i.e., fruits and vegetables, and, in particular, the refrigerator appliance may be operable to monitor produce, and configured for monitoring, the degree of ripeness of produce items stored therein. Thus, the drawers 140 may also be referred to as produce drawers 140 or as a vegetable drawer 140 and a fruit drawer 140. For example, in some embodiments, the refrigerator appliance may include two drawers 140, e.g., as illustrated in FIG. 3.

Referring now generally to FIGS. 3 through 6, refrigerator appliance 100 may further include an inventory management system that is generally configured to monitor one or more chambers of refrigerator appliance 100 to monitor the status of inventory stored therein. More specifically, as described in more detail below, inventory management system may include one or more cameras 192 (see, e.g., FIG. 3) to detect and monitor the ripeness status of objects (e.g., produce items identified generally by reference numeral 182 in FIG. 5) that are positioned in the drawers 140 or otherwise in view of cameras 192. The degree of ripeness can correlate with the amount of chlorophyll in a produce item. As produce ripens, chlorophyll in the produce, for example in the outer surface of the item, degrades. Consequently, the produce item loses the characteristic green color associated with the chlorophyll. Ripeness of a produce item may be estimated or predicted by a change in the green color in the produce item, or when the green color in a produce item reaches a predetermined level.

In this regard, inventory management system may use data from the cameras 192 to obtain a representation or knowledge of the ripeness status of produce items 182, e.g., produce items such as fruits and/or vegetables, within the drawers 140. For example, camera 192 may obtain images of produce items 182 for comparison or analysis of the green channel value in the RGB color model. A particular measure of the green component value, or an average value of the green hue from pixels associated with the produce item, may correspond to a ripeness value of a particular produce item. Although the inventory management system is described herein as monitoring drawers 140 for the detection of ripeness of produce items 182, it should be appreciated that aspects of the present subject matter may be used to monitor objects or items in any other suitable chamber within the refrigerator appliance 100.

As shown schematically in FIG. 3, the inventory management system may include a camera assembly 190 that is generally positioned and configured for obtaining images of refrigerator appliance 100 during operation. Specifically, according to the illustrated embodiment, camera assembly 190 includes one or more cameras 192 that are mounted to cabinet 120, to doors 126, 128, or are otherwise positioned in view of chilled chamber 122. As shown in FIG. 3, a camera 192 of camera assembly 190 is mounted to cabinet 120 at a front opening of chilled chamber 122 and is oriented to have a field of view 194 directed across the front opening and/or into chilled chamber 122, and in particular into the drawers 140, such as when the drawers 140 are in an open position, such as extended forward generally along the transverse direction T such that one or both of the drawers 140 extend beyond (forward of) a front edge of a shelf 142 or shelves 142 between the camera assembly 190 and the drawers 140.

Although a single camera 192 is illustrated in FIG. 3, it should be appreciated that camera assembly 190 may include a plurality of cameras 192 positioned within cabinet 120, wherein each of the plurality of cameras 192 has a specified monitoring zone or range positioned around chilled chamber 122. In this regard, for example, the field of view 194 of each camera 192 may be limited to or focused on a specific area within chilled chamber 122, such as one camera 192 for each drawer 140.

Notably, however, it may be desirable to position each camera 192 proximate the front opening of chilled chamber 122 and orient each camera 192 such that the field of view 194 is directed into chilled chamber 122. According to exemplary embodiments, camera assembly 190 may be used to facilitate an inventory management process for refrigerator appliance 100. As such, each camera 192 may be positioned at an opening to chilled chamber 122 to monitor produce items (identified generally as objects 182) that are placed in or stored in the drawers 140.

It should be appreciated that according to alternative embodiments, camera assembly 190 may include any suitable number, type, size, and configuration of camera(s) 192 for obtaining color images of any suitable areas or regions within or around refrigerator appliance 100. In addition, it should be appreciated that each camera 192 may include features for adjusting the field of view and/or orientation.

It should be appreciated that the images obtained by camera assembly 190 may vary in number, frequency, angle, resolution, detail, etc. in order to improve the clarity of the particular regions surrounding or within refrigerator appliance 100. In addition, according to exemplary embodiments, controller 134 may be configured for illuminating the chilled chamber using one or more light sources prior to obtaining images. Notably, controller 134 of refrigerator appliance 100 (or any other suitable dedicated controller) may be communicatively coupled to camera assembly 190 and may be programmed or configured for analyzing the images obtained by camera assembly 190, e.g., in order to identify and analyze produce items 182 stored in refrigerator appliance 100, as described in more detail below.

In general, controller 134 may be operably coupled to camera assembly 190 for analyzing one or more images obtained by camera assembly 190 to extract useful information regarding objects 182 located within the drawers 140. In this regard, for example, images obtained by camera assembly 190 may be used to identify a produce item, or obtain other product information related to produce item 182. Notably, this analysis may be performed locally (e.g., on controller 134) or may be transmitted to a remote server (e.g., in the "cloud," as those of ordinary skill in the art will recognize as referring to a remote server or database in a distributed computing environment including at least one remote server and the local controller 134) for analysis. Such analysis is intended to facilitate inventory management, e.g., by identifying a food item and detecting and monitoring its ripeness.

Specifically, according to an exemplary embodiment, camera 192 (or multiple cameras 192 in the camera assembly 190 collectively) is oriented to look down from a top center of cabinet 120 and has a field of view 194 (e.g., as shown schematically in FIG. 3 and corresponding to the exemplary image of FIG. 5) that covers a width of chilled chamber 122, e.g., a collective width of both drawers 140. In this manner, the field of view 194 of camera 192, and the resulting images obtained, may capture any produce item 182 stored in drawers 140. The images obtained by camera assembly 190 may include one or more still images, one or more video clips, or any other suitable type and number of images suitable for identification of food items (e.g., identified generally by reference numeral 182) for inventory analysis and ripeness detection.

Notably, camera assembly 190 may obtain images upon any suitable trigger, such as a time-based imaging schedule where camera assembly 190 periodically images and monitors the drawers 140. According to still other embodiments, camera assembly 190 may periodically take low-resolution images until motion (such as opening, e.g., sliding forward, of one or both drawers 140) is detected (e.g., via image differentiation of low-resolution images), at which time one or more high-resolution images may be obtained. According to still other embodiments, refrigerator appliance 100 may include one or more motion sensors (e.g., optical, acoustic, electromagnetic, etc.) that are triggered when drawers 140 are extended to an open position, and camera assembly 190 may be operably coupled to such motion sensors to obtain images of the produce items 182 during such movement. Other suitable imaging triggers are possible and within the scope of the present subject matter.

According to still other embodiments, refrigerator appliance 100 may include a door switch that detects when one or more refrigerator doors 126, 128 are opened, at which point camera assembly 190 may begin obtaining one or more images. According to exemplary embodiments, the image 196 (FIG. 5) may be obtained continuously or periodically while refrigerator doors 126, 128 are open and/or while one or both drawers 140 are in the open position. In this regard, obtaining image 196 may include determining that a door and/or drawer of the refrigerator appliance is open and capturing images at a set frame rate while the door and/or drawer is open.

Figure 6:
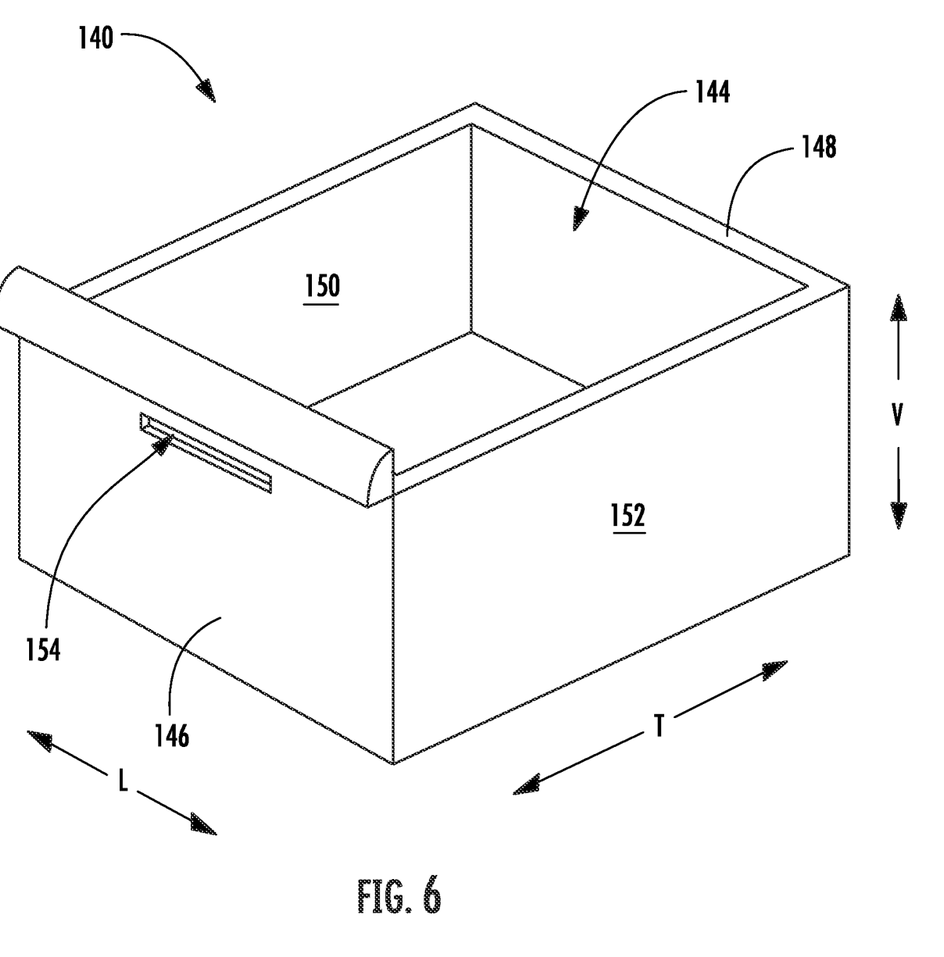
FIG. 6 provides a perspective view of a drawer which may be incorporated into a refrigerator appliance in one or more exemplary embodiments of the present subject matter.

Referring now to FIG. 6, an exemplary drawer 140 may include a food storage compartment 144. The food storage compartment 144 may be defined by a plurality of walls of the drawer 140. For example, the plurality of walls may include a front wall 146, a back wall 148, a left wall 150, and a right wall 152. Directional terms such as "left" and "right" are used herein with reference to the perspective of a user standing in front of the refrigerator appliance 100 to access items stored therein. One of the walls, e.g., the front wall 146 as in the illustrated example embodiment of FIG. 6, may include one or more vent apertures 154 defined in and through the wall, e.g., the front wall 146. In such embodiments, the drawer 140 may include a humidity control knob, slider, or lever which adjusts the degree of openness of the vent aperture 154.

Now that the construction and configuration of refrigerator appliance 100 and camera assembly 190 have been presented according to an exemplary embodiment of the present subject matter, exemplary methods for operating a refrigerator appliance, such as refrigerator appliance 100, are provided. Such methods may also be used to operate a camera assembly, e.g., camera assembly 190, or any other suitable camera assembly for monitoring produce inventory for ripening. In this regard, for example, controller 134 may be configured for implementing one or more of the following exemplary methods. However, it should be appreciated that the exemplary methods are discussed herein only to describe exemplary aspects of the present subject matter, and are not intended to be limiting.

Figure 7:
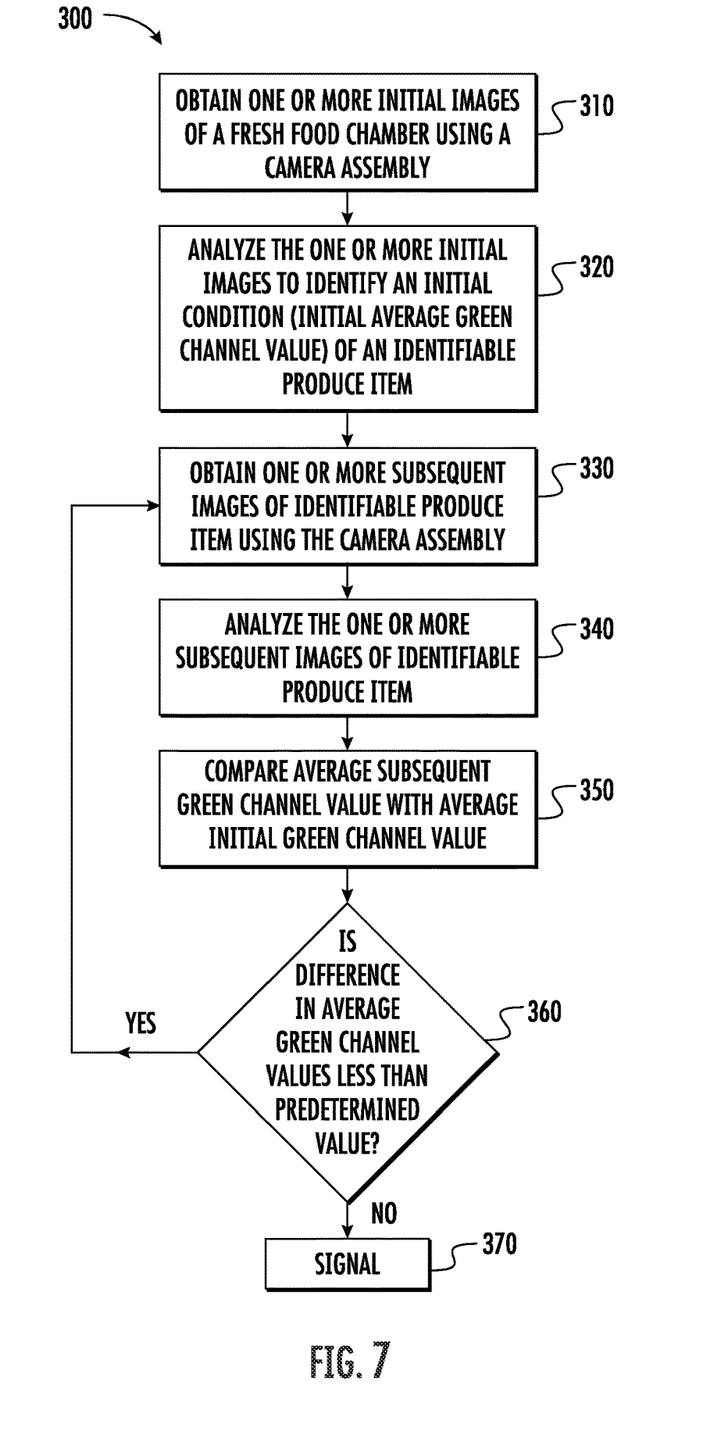
FIG. 7 provides a flow diagram of an exemplary method for operating a refrigerator appliance according to one or more exemplary embodiments of the present subject matter.

Turning now to FIG. 7, embodiments of the present disclosure may include a method 300 of operating a refrigerator appliance, such as the exemplary refrigerator appliance 100 described above. For example, the refrigerator appliance may include a controller and a cabinet defining a food storage chamber with a drawer slidably mounted within the food storage chamber. The drawer may be slidable between a closed position and an open position. The drawer may include a plurality of walls defining a food storage compartment.

Figure 5:
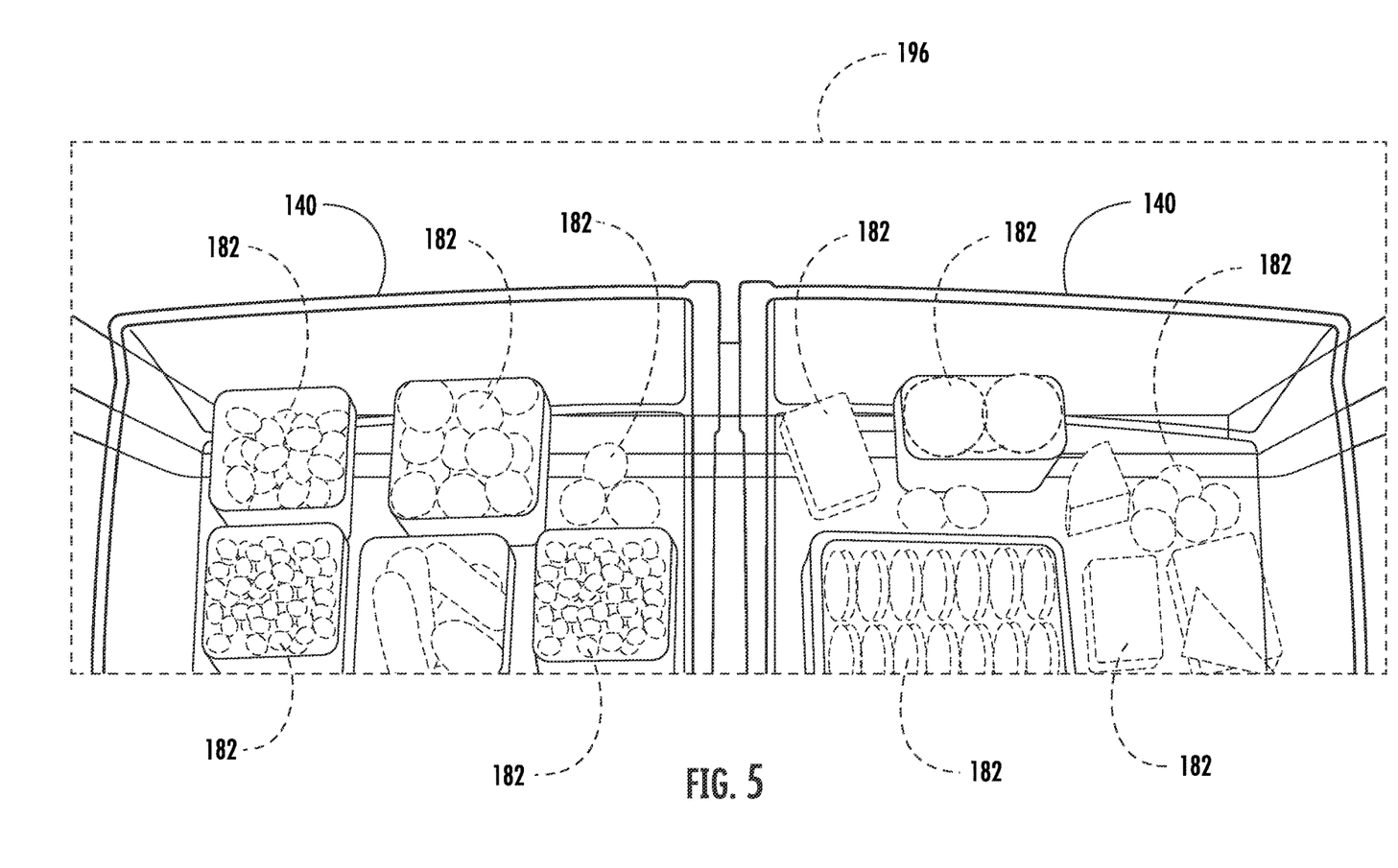
FIG. 5 illustrates an exemplary image of storage drawers of a refrigerator appliance, such as the exemplary refrigerator appliance of FIG. 1, in an open position and contents of the drawers, which image may be captured by a camera assembly in the refrigerator appliance according to the present disclosure.

As shown in FIG. 7, method 300 includes at step 310, obtaining one or more initial images of a fresh food chamber, or chilled chamber, using a camera assembly. For example, camera assembly 190 of refrigerator appliance 100 may obtain image 196 (e.g., as shown in FIG. 5) within chilled chamber 122, which may include in its field of view a plurality of produce items 182 in drawers 140. Although the term "image" is used herein, it should be appreciated that according to exemplary embodiments, camera 192 may take any suitable number or sequence of two-dimensional images, videos, or other visual representations of produce items 182 in drawers 140. For example, the one or more images may include a video feed or series of sequential static images obtained by camera 192 that may be transmitted to the controller 134 (e.g., as a data signal) for analysis, storage, comparison, or other manipulation. In other embodiments, images may be transmitted to the network 174 or remote server 176 for analysis, storage, comparison, or other manipulation. These obtained images may vary in number, frequency, angle, field-of-view, resolution, detail, etc.

Upon the first or initial encounter with a produce article, camera 192 takes one or more initial images of the contents of drawers 140 for identification of individual produce articles. Individual items are tagged using an object detection model to identify separate produce items. In obtaining the initial image or images, the object detection model is used to distinguish a particular produce item from other produce items, each of which may be an identifiable produce item. Once distinguished as an identifiable produce item, all images of that produce item are tagged and the item identified for the duration of its presence in the refrigerator appliance 100.

In some embodiments, the method may also include, and/or the refrigerator appliance may further be configured for, identifying one or more produce items, such as identifying a first produce item and a second produce item, e.g., based on one or more images. Each of the first and second produce items may be a distinguishable produce item. In some embodiments, identification of the produce item may be accomplished with the camera assembly. For example, the refrigerator appliance may include a camera, and the step of identifying the produce item may include identifying the produce item based on an image captured by the camera using, as discussed above, an object detection model. In some embodiments, the operation of the camera may be tied to the drawer opening, e.g., the camera may be operable and configured to capture an image each time the drawer is opened. The structure and operation of cameras are understood by those of ordinary skill in the art and, as such, the camera is not illustrated or described in further detail herein for the sake of brevity and clarity.

In such embodiments, the controller 134 of the refrigerator appliance 100 may be configured for image-based processing, e.g., to identify a produce item based on an image of the produce item, e.g., a photograph of the produce item taken with the camera(s) 192 of the camera assembly 190. For example, the controller 134 may be configured to identify the produce item by comparison of the image to a stored image of a known or previously identified produce item. In other embodiments, the image may be communicated to the network or a remote server for processing, storage, comparison, identification, or manipulation.

Step 320 may include analyzing the one or more initial images to identify an initial ripeness condition of the identifiable produce item, which may correspond to the initial green channel value. According to exemplary embodiments, this image analysis may use any suitable image processing technique, image recognition process, etc. As used herein, the terms "image analysis" and the like may be used generally to refer to any suitable method of observation, analysis, image decomposition, feature extraction, image classification, etc. of one or more images, videos, or other visual representations of an object. As explained in more detail below, this image analysis may include the implementation of image processing techniques, image recognition techniques, or any suitable combination thereof. In this regard, the image analysis may use any suitable image analysis software or algorithm to constantly or periodically monitor individually identified produce articles to determine degree of ripeness. It should be appreciated that this image analysis or processing may be performed locally (e.g., by controller 134) or remotely (e.g., by offloading image data to a remote server 176 or network 174).

Using the RGB color model, the color of the recorded image is described by indicating how much of each of red, green, and blue triplet of colors is present. The RGB color model and analysis is well known and will not be discussed here in depth for brevity. Briefly, each component color (red, green, blue, hence RGB) is a channel and assigned an integer value between 0 and 255, with 0 indicating that none of that color is present and a defined maximum of 255 representing the brightest saturated color. If all channels are 0, the resultant color is black. Alternately, if each channel is at the maximum of 255, white is the resultant color.

Images recorded by camera 192 are analyzed using the RGB color model, specifically for determining the green channel value of each identifiable individual produce item as a representation of the amount of chlorophyll present in the produce item. The green channel value corresponds to a ripeness condition or value for the identified individual produce item. The green channel includes light having a spectrum dominated by energy with a wavelength of roughly 495-570 nanometers (nm). Each image may be comprised of a plurality of pixels, with each pixel representing a portion of the produce item captured in the image. Each pixel may have at least a green channel value. An average green channel value for each pixel of an image may be determined by summing the green channel value of each pixel and dividing by the number of pixels counted. The average green channel value may be stored in a memory location of controller 134 (or network 174 or remote server 176) as an initial average green channel value for the identified produce article and used in later analysis. The initial average green channel value may correspond to an initial ripeness condition or value for the identified produce item.

Specifically, the analysis of the one or more images may include implementation of an image processing algorithm. As used herein, the terms "image processing" and the like are generally intended to refer to any suitable methods or algorithms for analyzing images that do not rely on artificial intelligence or machine learning techniques (e.g., in contrast to the machine learning image recognition processes described below). For example, the image processing algorithm may rely on differentiation of the average green channel value of a produce article from two images, specifically the initial image and a subsequent image. This comparison may help identify substantial differences between the degree of ripeness of produce from sequentially obtained images. For example, one or more initial images may be obtained when a produce article is first encountered by the cameras 192, and these initial images may be stored for future comparison with subsequently obtained images (i.e., images obtained in the future). Differences between the average green channel value of the reference (initial image) and the later-obtained (subsequent) image may be used to extract useful information regarding the degree of ripeness or a particular produce item.

Other image processing techniques are possible and within the scope of the present subject matter. The processing algorithm may further include measures for isolating or eliminating noise in the image comparison, e.g., due to image resolution, data transmission errors, inconsistent lighting, or other imaging errors. By eliminating such noise, the image processing algorithms may improve accurate produce item detection and evaluation of ripeness as correlated to the average green channel value.

In addition to the image processing techniques described above, the image analysis may include utilizing artificial intelligence ("AI"), such as a machine learning image recognition process, a neural network classification module, any other suitable artificial intelligence (AI) technique, and/or any other suitable image analysis techniques. Moreover, each of the exemplary image analysis or evaluation processes described may be used independently, collectively, or interchangeably to extract detailed information regarding the average green channel values being analyzed to facilitate performance of the present produce ripening detection system. According to exemplary embodiments, any suitable number and combination of image processing, image recognition, or other image analysis techniques may be used to obtain an accurate analysis of the obtained images.

It should be appreciated that image processing and machine learning image recognition processes may be used together to facilitate improved image analysis, object detection, color detection, or to extract other useful qualitative or quantitative data or information from the one or more images that may be used to improve the operation or performance of the produce ripening detection system. Indeed, the methods described herein may use any or all of these techniques interchangeably to improve the image analysis process and facilitate improved appliance performance and consumer satisfaction. The image processing algorithms and machine learning image recognition processes described herein are only exemplary and are not intended to limit the scope of the present subject matter in any manner.

It is generally understood that the amount of chlorophyll in fresh produce (i.e., fruits and vegetables) decreases as the produce ripens. The initial green channel value (i.e., an initial ripeness value) obtained at step 320 may be a benchmark for comparison with subsequent images obtained from the camera 192.

At step 330 one or more secondary or subsequent images of identifiable produce item are obtained by cameras 192 of the contents of drawers 140 as above. subsequent images are images taken temporally later than the initial images. Subsequent images may be taken at predetermined times or triggered by an event, such as the drawer containing the produce item being extended from the receiving space (i.e., moved to an open position).

Each subsequent image of identifiable produce items is processed as discussed above for the initial images. At step 340, the subsequent image obtained at 330 is analyzed as above in 320 for the initial image. The average green channel value is determined using the same methods and may correspond with a subsequent ripeness condition.

At step 350, the subsequent ripeness condition or value (i.e., the average green channel value of the subsequent image) for an identifiable produce item is compared to the initial ripeness condition or value (i.e., the initial average green channel value) for the same identified produce article. Comparing the average subsequent green channel value with the initial average green channel value may be achieved by mathematically subtracting the subsequent value from the initial value to obtain a numerical difference. As discussed above, the chlorophyll in produce decreases as the produce ripens. Comparing the green channel values of an initial image with the green channel value of a temporally later (i.e., subsequent or future) image provides an indication of the decrease of chlorophyll for that particular identified produce item. The numerical difference of ripeness values can be determined locally by controller 134 or may be calculated at the network 174 or remote server 176.

Different types of produce items may have different criteria for ripeness. In some cases, the determined numerical difference between the initial green channel value (initial ripeness value) and a subsequent green channel value (subsequent ripeness value) may be used to predict the degree of ripeness for produce items. It may be determined that a particular numerical difference is indicative of an optimally ripened identified produce item. In other cases, a single green channel value alone may be sufficient to determine if an identified produce item is adequately ripened. That is, a produce item may be optimally ripe when the average green channel reaches a particular value (i.e., a ripeness value) rather than decreases by a certain amount.

At step 360, the numerical difference between the initial and subsequent average green channel values is compared to a predetermined difference for that particular identifiable produce item. If the difference is less than the predetermined difference, the method 300 goes back to step 330 to obtain additional subsequent images. If the difference is equal to or greater than the predetermined difference, method 300 advances to step 370. The predetermined difference corresponds to a ripeness condition, for example an optimal ripeness value, for the identifiable produce item.

For produce items using a single green channel value for determining ripeness, at 360, the green channel value of the temporally latest image is compared to the predetermined ripeness value for that identifiable produce item. If the value is less than the predetermined ripeness value, the method 300 goes back to step 330 to obtain additional subsequent images. If the difference is equal to or greater than the predetermined ripeness value, method 300 advances to step 370.

At 370, the method 300 may communicate to one or more of display 133, speaker 158, and external device 172, signaling that the produce ripening system has determined that one or more produce items have reached a particular ripeness value, corresponding to an average green channel value, indicative of an optimal degree of ripeness. In response to the communication, display 133 and external device 172 may provide one or more of a graphic display, a textual message, and an audible signal to alert a user to the ripe condition of identified produce item(s). External device 172 may provide haptic feedback to the user in addition to or instead of a textual message and an audible signal. Speaker 139 may provide the user with an audible signal to indicate the ripe condition of identified produce item(s). The audible signal may be a recorded natural voice message, a synthetic voice message, or a tone or series of tones to draw attention to the refrigerator appliance 100.

In some embodiments, step 370 continues to signal the user until the ripened produce item is removed from the refrigerator appliance. As long as other produce items remain in the drawer 140, method 300 continues as above for each identifiable item.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a refrigerator appliance, the refrigerator appliance comprising a cabinet defining a chilled chamber for receiving a produce item and a camera assembly positioned with a field of view including the produce item, the method comprising:
   obtaining an initial image of the produce item using the camera assembly;
   analyzing the initial image using an image recognition process to identify an initial ripeness value of the produce item;
   obtaining a subsequent image of the produce item using the camera assembly;
   analyzing the subsequent image using the image recognition process to identify a subsequent ripeness value of the produce item;
   comparing the subsequent ripeness value to the initial ripeness value to determine if a difference has reached a predetermined value; and
   signaling that an optimal ripeness condition has been reached if the predetermined value has been reached.

2. The method of claim 1, wherein, the refrigerator appliance further comprises a drawer slidably mounted within the chilled chamber and slidable between a closed position and an open position, the drawer comprising a plurality of walls defining a food storage compartment;
   wherein the camera assembly is positioned and configured for monitoring the food storage compartment when the drawer is in the open position.

3. The method of claim 1, wherein analyzing the initial image comprises distinguishing an identifiable produce item.

4. The method of claim 3, wherein analyzing the initial image further comprises determining a green channel value of the initial image as the initial ripeness value of the identifiable produce item.

5. The method of claim 4, wherein the initial image comprises a plurality of pixels, each of the plurality of pixels having a green channel value, further wherein analyzing the initial image comprises determining an average initial green channel value.

6. The method of claim 5, further comprising wherein analyzing the subsequent image comprises distinguishing the identifiable produce item.

7. The method of claim 6, wherein analyzing the subsequent image further comprises determining a green channel value of the subsequent image as the subsequent ripeness value of the identifiable produce item.

8. The method of claim 7, wherein the subsequent image comprises a plurality of pixels, each of the plurality of pixels having a green channel value, further wherein analyzing the subsequent image comprises determining an average subsequent green channel value.

9. The method of claim 8, wherein comparing the subsequent ripeness value to the initial ripeness value comprises subtracting the average subsequent green channel value from the average initial green channel value to determine a difference, and comparing the difference to a predetermined difference corresponding to a ripeness value.

10. The method of claim 1, wherein signaling comprises providing one or more of a graphic image, a textual message, and an audible signal to a user.

11. The method of claim 10, wherein the refrigerator appliance further comprises a user interface panel having a speaker and a display, the graphic image or textural message being provided on the display, and the audible signal emitting from the speaker.

12. The method of claim 10, wherein the refrigerator appliance further comprises an external communication system having an external device, wherein the external device provides the one or more of the graphic image, the textual message, and the audible signal.

13. A refrigerator appliance comprising:
a cabinet defining a chilled chamber for receiving a produce item;
a camera assembly positioned with a field of view including the produce item; and
a controller in operable communication with the camera assembly, the controller operable to perform a method of operating the refrigerator appliance, the method comprising:
obtaining an initial image of the produce item using the camera assembly;
analyzing the initial image using an image recognition process to identify an initial ripeness value of the produce item;
obtaining a subsequent image of the produce item using the camera assembly;
analyzing the subsequent image to identify a subsequent ripeness value;
comparing the subsequent ripeness value to the initial ripeness value to determine if a difference has reached a predetermined value; and
signaling that an optimal ripeness condition has been reached if the predetermined value has been reached.

14. The refrigerator appliance of claim 13 further comprising a drawer slidably mounted within the chilled chamber and slidable between a closed position and an open position, the drawer comprising a plurality of walls defining a food storage compartment, wherein, the camera assembly is positioned and configured for monitoring the food storage compartment when the drawer is in the open position.

15. The refrigerator appliance of claim 13, wherein:
analyzing the initial image comprises distinguishing an identifiable produce item; and
analyzing the subsequent image comprises distinguishing the identifiable produce item.

16. The refrigerator appliance of claim 15, wherein:
analyzing the initial image comprises determining a green channel value of the initial image as the initial ripeness value of the identifiable produce item; and
analyzing the subsequent image comprises determining a green channel value of the subsequent image as the subsequent ripeness value of the identifiable produce item.

17. The refrigerator appliance of claim 16, wherein:
the initial image comprises a plurality of pixels, each of the plurality of pixels having a green channel value, further wherein analyzing the initial image comprises determining an average initial green channel value; and
the subsequent image comprises a plurality of pixels, each of the plurality of pixels having a green channel value, further wherein analyzing the subsequent image comprises determining an average subsequent green channel value.

18. The refrigerator appliance of claim 17, wherein comparing the subsequent ripeness value to the initial ripeness value comprises subtracting the average subsequent green channel value from the average initial green channel value to determine a difference, and comparing the difference to a predetermined difference corresponding to a ripeness value.

19. The refrigerator appliance of claim 13 further comprising:
a user interface panel having a speaker and a display; and
an external communication system having an external device;
wherein signaling comprises providing one or more of a graphic image, a textual message, and an audible signal to one or more of the speaker, the display, and the external device.

20. A method of operating a refrigerator appliance, the refrigerator appliance comprising a cabinet defining a chilled chamber for receiving a produce item and a camera assembly positioned with a field of view including the produce item, the method comprising:
obtaining an initial image of the produce item using the camera assembly;
analyzing the initial image using an image recognition process to identify an initial green channel value of the produce item;
obtaining a subsequent image of the produce item using the camera assembly;
analyzing the subsequent image using the image recognition process to identify a subsequent green channel value of the produce item;
comparing the subsequent green channel value to the initial green channel value to determine if a difference has reached a predetermined value; and
signaling that an optimal ripeness condition has been reached if the predetermined value has been reached.

* * * * *